United States Patent [19]

Tanaka

[11] Patent Number: 5,175,418
[45] Date of Patent: Dec. 29, 1992

[54] INFORMATION CARD SYSTEM
[75] Inventor: Katsuyuki Tanaka, Kanagawa, Japan
[73] Assignee: Sony Corporation, Tokyo, Japan
[21] Appl. No.: 627,499
[22] Filed: Dec. 14, 1990
[30] Foreign Application Priority Data Dec. 19, 1989 [JP]  Japan .................. 1-330027

[51] Int. Cl.⁵ .......................... G06K 7/00; G06K 5/00; G06K 19/06
[52] U.S. Cl. .................. 235/439; 235/380; 235/451; 235/492
[58] Field of Search ............ 235/439, 449, 492, 493, 235/487, 451, 375, 380

[56] References Cited

U.S. PATENT DOCUMENTS

| | | | |
|---|---|---|---|
| 4,720,626 | 1/1988 | Nishikawa et al. | 235/449 |
| 4,797,541 | 1/1989 | Billings et al. | 235/449 |
| 4,798,322 | 1/1989 | Bernstein et al. | 235/449 |
| 4,803,350 | 2/1989 | Izawa et al. | 235/492 |
| 4,814,595 | 3/1989 | Gilboa | 235/487 |
| 4,893,118 | 1/1990 | Lewiner et al. | 235/382 |
| 4,924,171 | 5/1990 | Baba et al. | 235/493 |
| 4,960,983 | 10/1990 | Inoue | 235/493 |
| 5,013,898 | 5/1991 | Glasspool | 235/493 |
| 5,015,834 | 5/1991 | Suzuki et al. | 235/493 |

Primary Examiner—Eugene R. LaRoche
Assistant Examiner—Tan Nguyen
Attorney, Agent, or Firm—Alvin Sinderbrand; William S. Frommer

[57] ABSTRACT

An information card system operating in a non-contact manner comprises an information card including a data storage, a card reader and a card writer. The card writer writes information data, such as an identification code, on the card. The card reader sends an interrogation or response requiring signal to the card, and the card responds thereto with a signal containing its information data. The card has a pair of electrode plates adapted for static coupling with a pair of electrode plates included in the card writer. The card's electrode plates alternatively can act as a dipole antenna. The card additionally has a loop shaped electrode pattern for communicating with the card reader. The loop shape permits the pattern to modulate a magnetic field generated by the reader. The size of the loop shaped electrode pattern permits it to alternatively act as an antenna.

2 Claims, 8 Drawing Sheets

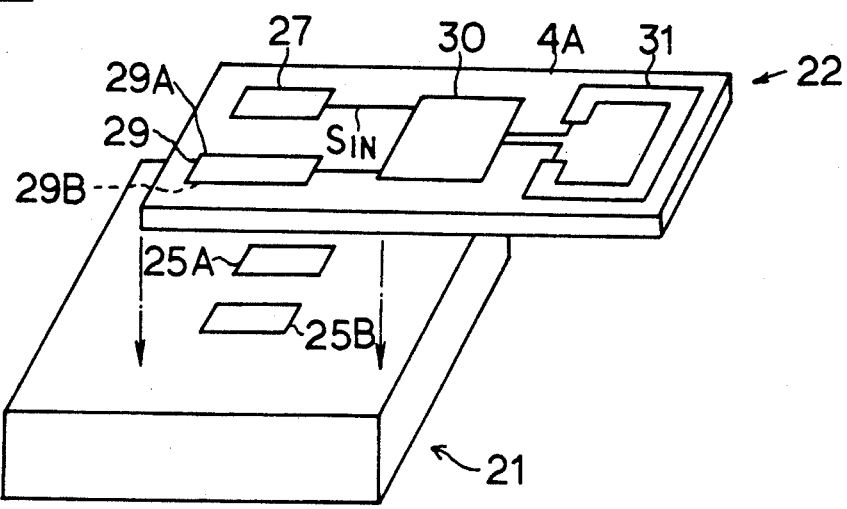
FIG. 4
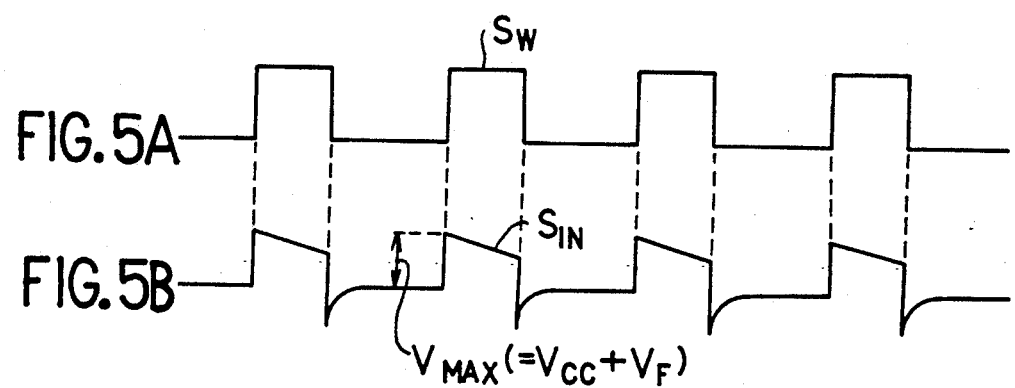
FIG. 5A
FIG. 5B

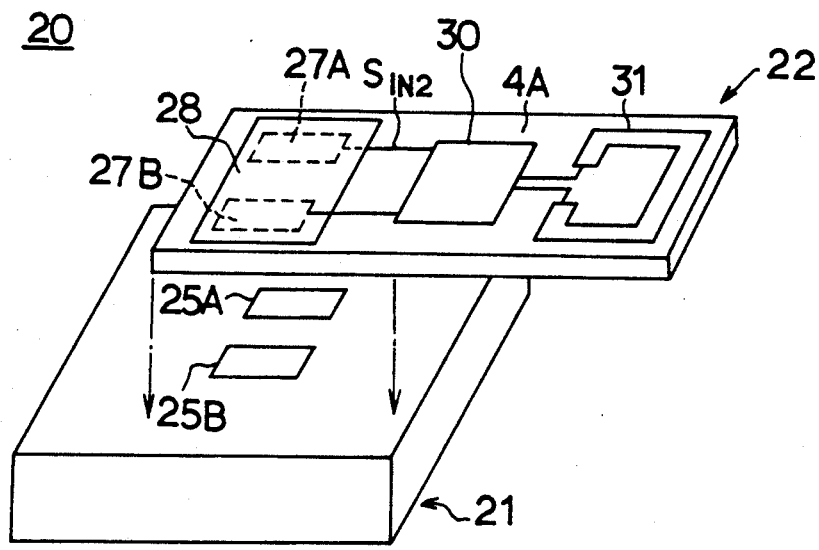
FIG.7
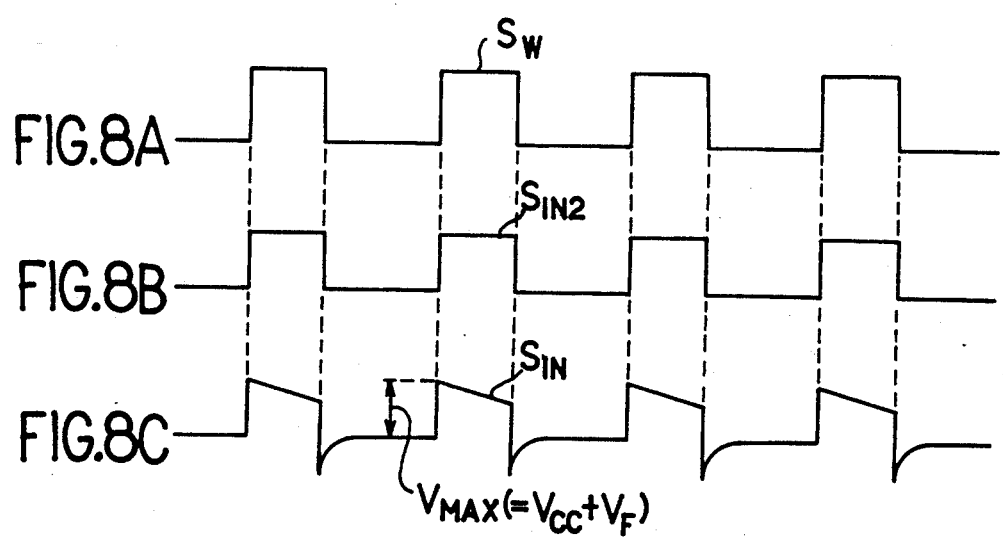

INFORMATION CARD SYSTEM

BACKGROUND OF THE INVENTION

1. Field of the Invention

The present invention relates to an information card system and particularly relates to an information card system which writes information on the card in a non-contact manner.

2. Prior Art

An example of a conventional information card reader which reads information from an information card is illustrated in FIG. 1. In an information card reader 1, an interrogation, or, response requiring, signal W1 using a microwave frequency of 2.45 GHz, for example, as a carrier, is generated in a response requiring signal generating circuit 2 and is broadcast from a transmission antenna 3 to an information card 4. A response information signal W2 which is returned from the information card 4 is received in a response signal processing circuit 6 through a receiving antenna 5. In this manner, the information card reading system may be used for detecting visitors who have no information card 4 as an identification card or checking freight with the information card 4 as a tag.

Japanese Patent (unexamined) Laid-open No. 1 (1989)-182782 proposes that the information card 4 which is used in such an information card reading system comprise a dipole antenna 4B, an information signal generating circuit 4C and a power supply battery 4D which are connected by a wiring pattern 4E. The dipole antenna 4B is mounted on the wiring board 4A to form part of the wiring pattern, and the information signal generating circuit 4C has an integrated circuit (IC) structure. The dipole antenna 4B changes its reflection ratio when responding to the carrier of the response requiring signal W1 broadcast from the information reader 1, by changing its impedance at a feeding point according to an information signal generated in the information signal generating circuit 4C, thereby making the reflected wave become the response information signal W2.

The information signal generating circuit 4C has an electrical circuit configuration as shown in FIG. 2. Information data S1 previously stored in an information memory 11, a PROM, for example, is read according to an address signal S3 of an address counter 13 which is actuated by a clock signal S2 of a clock signal generator 12, and the information data read is supplied to a variable impedance circuit 14 which is shown constituted by a field effect transistor.

The variable impedance circuit 14 is interconnected between a pair of feeding point terminals T1 and T2 to which the dipole antenna 4B is connected. Thus, impedance of the dipole antenna 4B at the feeding point is variably controlled by performing on-off actuation of the field effect transistor when the information data S1 changes between logic "1" or "0", thereby variably controlling the reflection ratio in respect to the response requiring signal W1 incident upon the dipole antenna 4B.

Interconnected between the earth side feeding point terminal T1 and a power supply terminal T3 of the information signal generating circuit 4C is a power supply battery 4D. This enables the variable control of the impedance at the feeding point of the dipole antenna 4B to be continuously effected in accordance with the information data S1.

A specific identification code is allotted to the information memory 11 of each information card 4, and hence information contained in each information card 4 identifies the respective information card.

To initialize, that is, write identification code information on, to the information card 4, it has been proposed to bring electrodes of a writer into contact with electrodes (not shown) of the information card 4. However, this method of writing information in a contact manner produces a problem in that during mass production of the information card, productivity is reduced due to the additional time required for effecting direct contact.

To overcome this problem it has been proposed to provide electrode plates, instead of a dipole antenna and contact electrodes, on an information card to send and receive information. The plates are placed in the vicinity of plates formed on a separate writer to produce an electric coupling between them for sending and receiving information in a non-contact manner (Japanese Patent (unexamined) Laid-open Publication 63 (1988)-39396). However, in both writing information on and reading information from the information card, the information card must be placed in the vicinity of the information reader since the information card uses the plates for writing and reading information. Thus, the information card is insufficient in its ease of use.

SUMMARY OF THE INVENTION

Accordingly, it is an object of the present invention to provide an information card system which is capable of writing information on an information card in a non-contact manner with excellent ease of use.

It is another object of the present invention to provide an information card system which is capable of preventing deterioration in information data signal when the information data signal is transmitted from an information writer to an information card by static coupling.

It is still another object of the present invention to provide an information card system which is capable of reading data stored in an information card in a non-contact manner with a simple construction.

In order to achieve these and other objects, the present invention provides an information card system comprising a card reader; an information card including first electrode means for receiving information data, storage means for storing information data therein, therein, second electrode means for receiving an interrogation signal from said card reader, means for transforming the interrogation signal in response to the information data and means for transmitting the transformed signal through said second electrode means, back to the card reader; and an information writer including information data generating means for generating the information data, and third electrode means supplied with the information data and generating an electrical field in cooperation with the first electrode means when the information card is disposed to be proximate to the information writer, whereby the information data is written in said storage means of the information card without any contact between the information card and the information writer.

BRIEF DESCRIPTION OF THE DRAWINGS

FIG. 4 is a perspective view of the information card system of FIG. 3;

FIGS. 5A and 5B are waveform charts illustrating the operation of the information card system of FIG. 3;

FIG. 7 is a perspective view of the information card system of FIG. 6;

FIGS. 8A, 8B and 8C are waveform charts illustrating the operation of the information card system of FIG. 6;

DETAILED DESCRIPTION OF THE PREFERRED EMBODIMENTS

Figure 3:
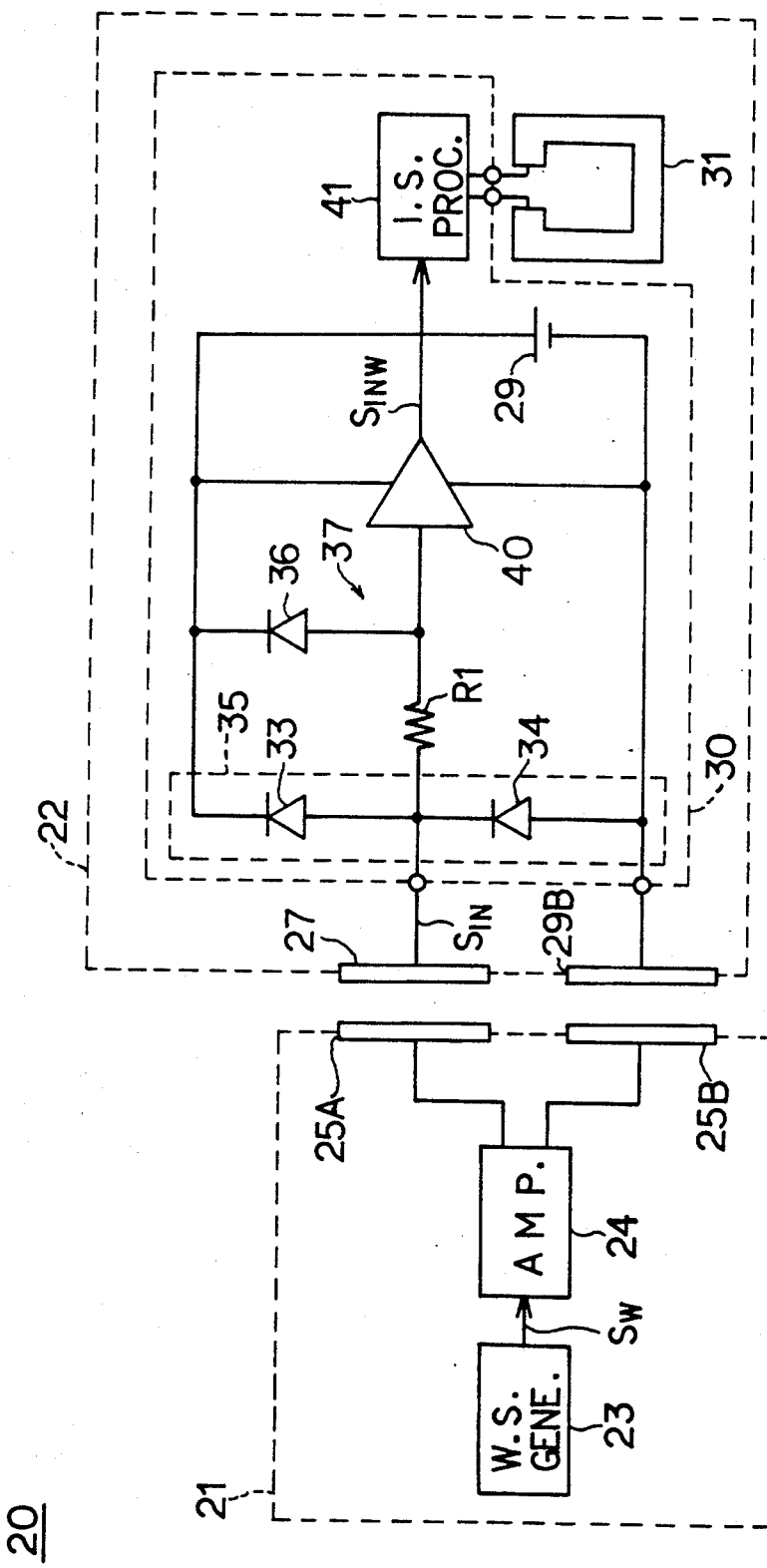
FIG. 3 is a block diagram showing an information card system in accordance with a first embodiment of the present invention.

Referring to FIGS. 3 and 4, an information card system 20 according to an embodiment of the present invention will be described. The information card system 20 includes an information card 22 and an information writer 21 for writing information in the information card 22. In the information writer 21, a write signal generating circuit 23 produces a write information signal $S_W$ according to predetermined information data and sends it as a baseband signal to writing electrodes 25A and 25B through an amplifying circuit 24. Thus, a change in voltage is produced between the writing electrodes 25A and 25B in response to the write information signal $S_W$.

As shown in FIG. 4, the information card 22 includes a printed wiring board 4A on which are mounted a plate 27, a power supply battery 29 and an integrated circuit 30. The plate 27 and the power supply battery 29 are connected to the integrated circuit 30 through a wiring pattern, and the information card 22 is sealed at the front with sealing sheet material.

The power supply battery 29 is a so-called paper battery in the shape of a rectangular thin sheet 20 mm wide and 30 mm long, for example, and the power supply battery 29 has a front electrode surface 29A serving as a positive electrode and a rear electrode surface 29B serving as a negative electrode.

The plate 27 is in the shape of a rectangle 8 mm wide and 15 mm long, for example, and constitutes part of the wiring pattern. The plate 27 and the power supply battery 29 are provided on the front of the information card 22 in the same plane so that the plate 27 and the power supply battery 29 oppose or face the writing electrodes 25A and 25B respectively when the information card 22 is disposed to be proximate to, i.e., is placed in the vicinity of, the information writer 21. Thus, the electrode surface 29B and the plate 27 are used as electrode plates for inputting data. When the information card 22 is placed close to the information writer 21 at a predetermined distance, the writing electrodes 25A and 25B of the information writer 21 and the plate 27 and the electrode surface 29B of the information card 22 produce electric fields respectively. Thus, an electric field is generated by a write information signal $S_W$ which is supplied to the writing electrode 25A and another electric field is generated by a reference potential supplied to the writing electrode 25B, so that an input information signal $S_{IN}$ is produced at the plate 27 in response to the write information signal $S_W$ with respect to a reference potential of the electrode surface 29B. In this manner, the write information signal $S_W$ is transmitted to the information card 22 as the input information signal $S_{IN}$ in a non-contact fashion.

The input information signal $S_{IN}$ is, as shown in FIG. 3, supplied to an amplifier circuit 40 of complementary MOS fabrication, for example, through a clipper 35 and a current limiting circuit 37. The clipper 35 includes diodes 33 and 34 while the current limiting circuit 37 contains a resistor R1 and a diode 36. The input information signal $S_{IN}$ is amplified by the amplifier circuit 40 using the power supply battery 29 and is then sent as an input write signal $S_{INW}$ to an information signal processing circuit 41 for storage as information data. Thus, the write information signal $S_W$ is sent from the information writer 21 to the information card 22 in a non-contact manner and is stored in the information card 22 as information data.

Figure 2:
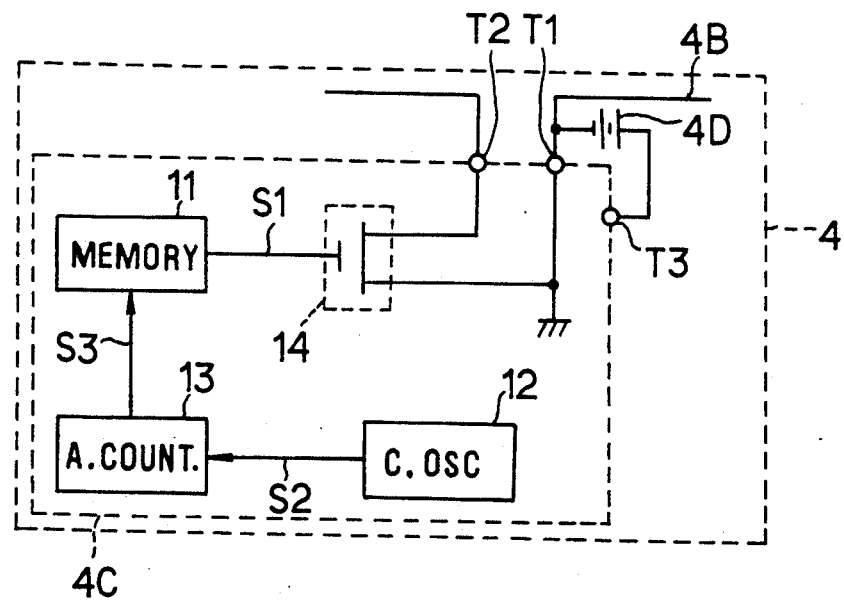
FIG. 2 is a block diagram showing in more detail the information signal generating circuit of FIG. 1.

On the printed wiring board 4A of the information card 22, there is mounted a loop-shaped electrode pattern 31 in addition to the plate 27 and the power supply battery 29. The electrode pattern 31 is connected through a wiring pattern to an information signal generating circuit 4C (FIG. 2) arranged within the information signal processing circuit 41.

Figure 1:
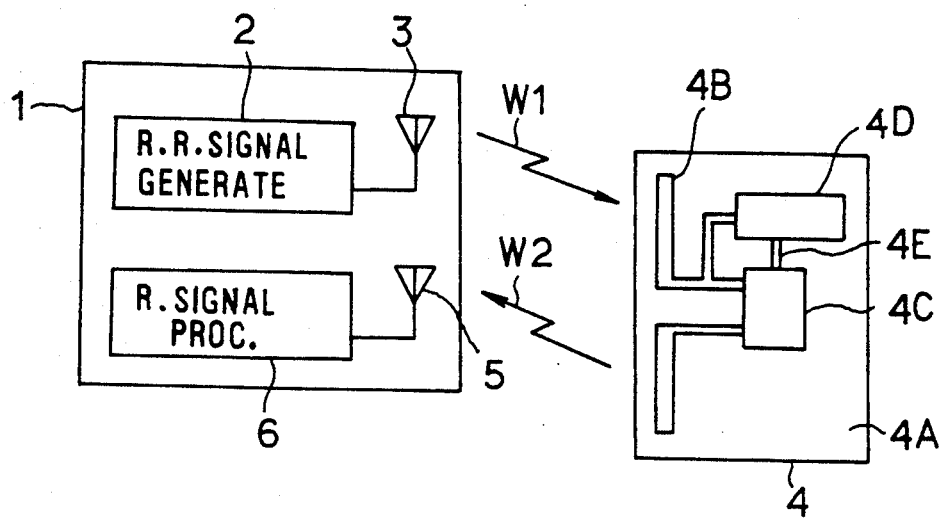
FIG. 1 is a block diagram illustrating the conventional information card system.

The electrode pattern 31 changes in impedance in response to an information data from the information signal generating circuit 4C. Because of the loop shape of the pattern 31, placing that electrode pattern 31 close to an information reading coil of an information reader (not shown) modulates the electromotive force induced in the information reading coil for permitting the information data from the information signal generating circuit 4C to be transmitted to the information reader in a non-contact manner. Additionally by forming the electrode pattern 31 with a length of one wavelength of a microwave, the electrode pattern 31 reflects an interrogation or response requiring signal W1 (FIG. 1) which is broadcast from the information reader with a microwave carrier, at a predetermined reflection coefficient, to thereby send a response information signal W2. Thus, the information data of the information signal generating circuit 4C is sent in a non-contact manner using microwave.

In the information card system 20, information data stored in the information card 22 can be read by a proximity information reader. Moreover, a remote information reader such as the information reader 1 in FIG. 1 can read the information data of the information card 22. The information card 22 may be used with a suitably constructed proximity or remote card reader as needed.

To write the write information signal $S_W$ from the information writer 21 into the information card 22, the information card 22 is brought close to the information writer 21 so that the writing electrodes 25A and 25B are placed at an interval of several millimeters from the plate 27 and the electrode surface 29B, respectively. In this event, the write information signal $S_W$ from the write signal generating circuit 23 is sufficiently amplified through the amplifying circuit 24, and electric fields are produced between the writing electrode 25A and the plate 27 and between the writing electrode 25B and the electrode surface 29B. Thus, the write information signal $S_W$ shown in FIG. 5A is transmitted to the plate 27 of the information card 22 in a non-contact manner using static coupling.

As shown in FIG. 3, the cathode of the diode 33 of the clipper 35 is maintained at a supply voltage $V_{CC}$ since the cathode is connected to the positive electrode of the power supply battery 29. When the input information signal $S_{IN}$ exceeds a voltage level $V_{MAX}$ which is equal to a forward direction operating voltage $V_F$ of the diode 33 added to the supply voltage $V_{CC}$ of the power supply battery 29, the diode 33 is turned on, and the input information signal $S_{IN}$ is thereby restricted in amplitude.

The anode of the diode 34 is held at the reference voltage, and when the input information signal $S_{IN}$ drops below the reference voltage, the diode 34 is turned on, so that the input information signal $S_{IN}$ is also limited in its negative amplitude.

As shown in FIG. 5B, the input information signal $S_{IN}$ is limited in amplitude to a predetermined signal level and is also limited in current by the resistor R1 and the diode 36 of the current limiting circuit 37. After such limiting, the input information signal $S_{IN}$ is supplied to the amplifier circuit 40, from which the input write signal $S_{INW}$ is sent to the information signal processing circuit 41, where the signal undergoes predetermined signal processing and is then stored in a memory thereof. In this manner, the amplifier circuit 40 and the information signal processing circuit 41 are protected even if the input information signal $S_{IN}$ is supplied at an excessively large signal level. Thus, the write information signal $S_W$ from the information writer 21 is positively written in the information card 22 in a non-contact manner.

In the information card system 20, the input write signal $S_{INW}$ derived from the write information signal $S_W$ is positively written in the memory of the information card 22 in a non-contact fashion in the following manner: electric fields are produced between the writing electrode 25A and the plate 27 and between the writing electrode 25B and the electrode surface 29B; the information signal $S_W$ is amplified by the amplifying circuit 24 of the information writer 21 to produce the input information signal $S_{IN}$ at a signal level required for static coupling; the input information signal $S_{IN}$ is limited in amplitude by the clipper 35 of the information card 22; and the input information signal $S_{IN}$ is limited in current by the current limiting circuit 37.

In this embodiment, the negative electrode surface 29B of the power supply battery 29 is used as a signal input electrode plate, and thus the wiring board 4A makes optimum use of the occupied space. This permits the information card 22 to be miniaturized.

In the information card system 20, the information card 22 uses, for example, a 8 mm×15 mm rectangular plate 27 and a 20 mm×30 mm rectangular electrode surface 29B, but the plate 27 and the electrode surface 29B may have various sizes and configurations. To work in cooperation with the plate 27 and the electrode surface 29B, the writing electrodes 25A and 25B of the information writer 21 are suitably arranged in configuration and size.

In the above described information card system 20, information is written in the information card 22 by static coupling, but the present invention is not limited to such coupling. Remote writing of information in the information card 22 using microwave may alternatively be achieved by forming the plate 27 and the electrode surface 29B to each have a length equal to half the wavelength of the microwave.

The information written in the information card 22 of the present embodiment can be read by either a proximity information reader or a remote information reader, as hereinafter described in detail, the proximity information reader reads information from the information card 22 by using the electrode pattern 31 for inductive coupling, and the remote information reader uses the electrode pattern 31 as a microwave antenna.

Figure 6:
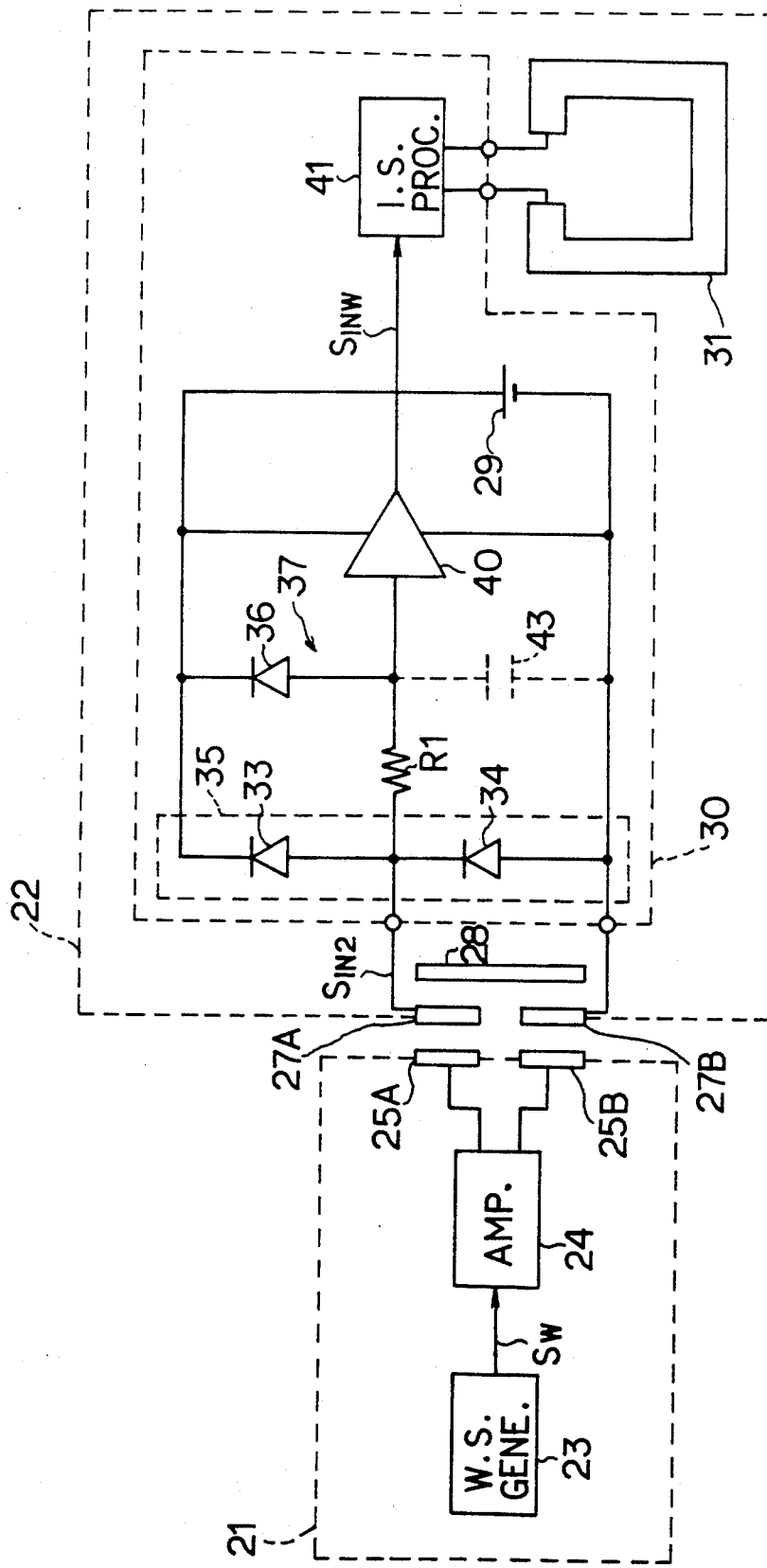
FIG. 6 is a block diagram showing an information card system in accordance with a second embodiment of the present invention.

Another embodiment of the present invention will now be described with reference to FIGS. 6 and 7 in which parts corresponding to the parts of FIGS. 3 and 4 are designated by the same reference numerals. The information writer 21 of FIG. 6 is identical in construction to the information writer 21 of FIG. 3, and its description is omitted.

As shown in FIG. 7, the information card 22 has plates 27A and 27B and a loop-shaped electrode pattern 31 mounted on a printed wiring board 4A. The plates 27A and 27B and the electrode pattern 31 are connected to the integrated circuit 30 to form parts of a wiring pattern, and the information card 22 is sealed at the front with a sealing sheet.

A plate 28 is provided to oppose or face the upper surfaces of the plates 27A and 27B at predetermined distances therefrom for adding capacitance. The plate 28 is formed to cover the plates 27A and 27B. An insulating film, such as a paper, is placed between the plate 28 and the plates 27A and 27B to maintain a predetermined interval therebetween and thereby providing predetermined capacitances.

The plates 27A and 27B are each in the shape of a rectangle about 8 mm wide and about 15 mm long. The plates 27A and 27B oppose or face the writing electrodes 25A and 25B respectively, when the information card 22 is placed in the vicinity of the information writer 21. While proximate the writer 21, the plates 27A and 27B are used as electrode plates for receiving data. When the information card 22 is placed close to the information writer 21 at a predetermined interval, the writing electrodes 25A and 25B of the information writer 21 and the plates 27A and 27B produce electric fields, respectively. Thus, an electric field is generated by a write information signal $S_W$ which is supplied to the writing electrode 25A and an electric field is generated by a reference potential which is supplied to the writing electrode 25B, so that an input information signal $S_{IN2}$ is produced at the plate 27A in response to the write information signal $S_W$ respect to a reference potential produced at the plate 27B.

The input information signal $S_{IN2}$ is, as shown in FIG. 6, supplied to a clipper 35 including diodes 33 and 34. This clipper 35 operates in the same manner as the clipper 35 of FIG. 3, and its description is omitted. The remaining construction of the information card 22 is the same as that of the information card 22 of the preceding embodiment, and its description is also omitted.

To write the write information signal $S_W$ from the information writer 21 into the information card 22 in the second embodiment, the information card 22 is brought close to the information writer 21 so that the writing electrodes 25A and 25B are placed at an interval of several millimeters from the plates 27A and 27B, respectively. This proximity causes the write information signal $S_W$ from the write signal generating circuit 23 to be sufficiently amplified through the amplifying circuit 24, so that electric fields are produced between the plate 27A and the writing electrode 25A and between the plate 27B and the writing electrode 25B. Thus, the write information signal $S_W$, shown in FIG. 8A, is received at the plate 27A of the information card 22 in a non-contact manner using static coupling.

The plate 28 provides additional capacitances to the plates 27A and 27B. Thus, the time constant of the input capacitance 43 which is produced in the integrated circuit 30 increases by the additional capacitances of the plates 27A and 27B. As a result, as shown in FIG. 8B, an input information signal $S_{IN2}$ supplied to the amplifier circuit 40 has a waveform similar to the waveform of the write information signal $S_W$ with little waveform distortion unlike the waveform shown in FIG. 8C. Then, the resultant input write signal $S_{INW}$ is sent to the information signal processing circuit 41, where it undergoes signal processing and is then stored in the memory. In this manner, the write information signal $S_W$ which has been sent from the information writer 21 is supplied to the information card 22 in a non-contact manner and is positively stored in it as information data.

In the second embodiment, provision of the plate 28 to face the plates 27A and 27B for additional capacitances enables information data to be positively written in the information card 22 from the information writer 21 in a non-contact manner with little waveform distortion in the input information signal $S_{IN2}$.

Figure 9:
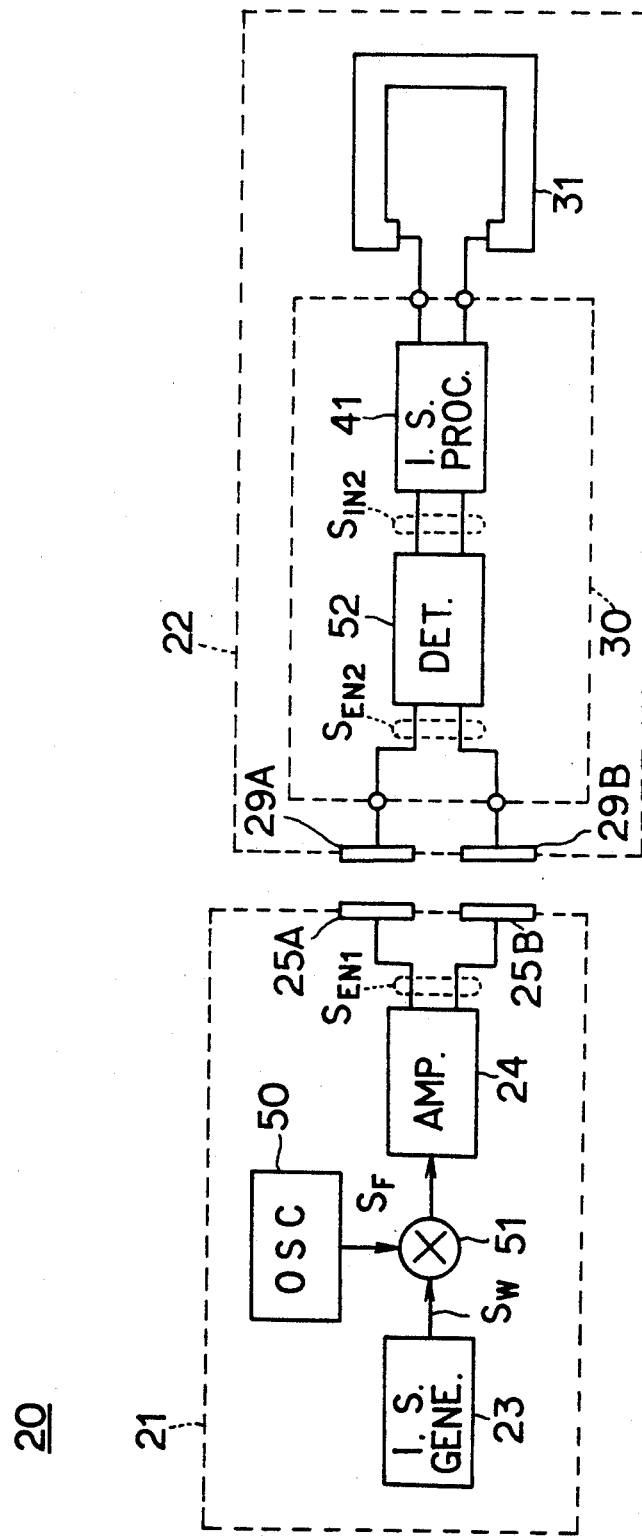
FIG. 9 is a block diagram showing an information card system in accordance with a third embodiment of the present invention.
Figure 10:
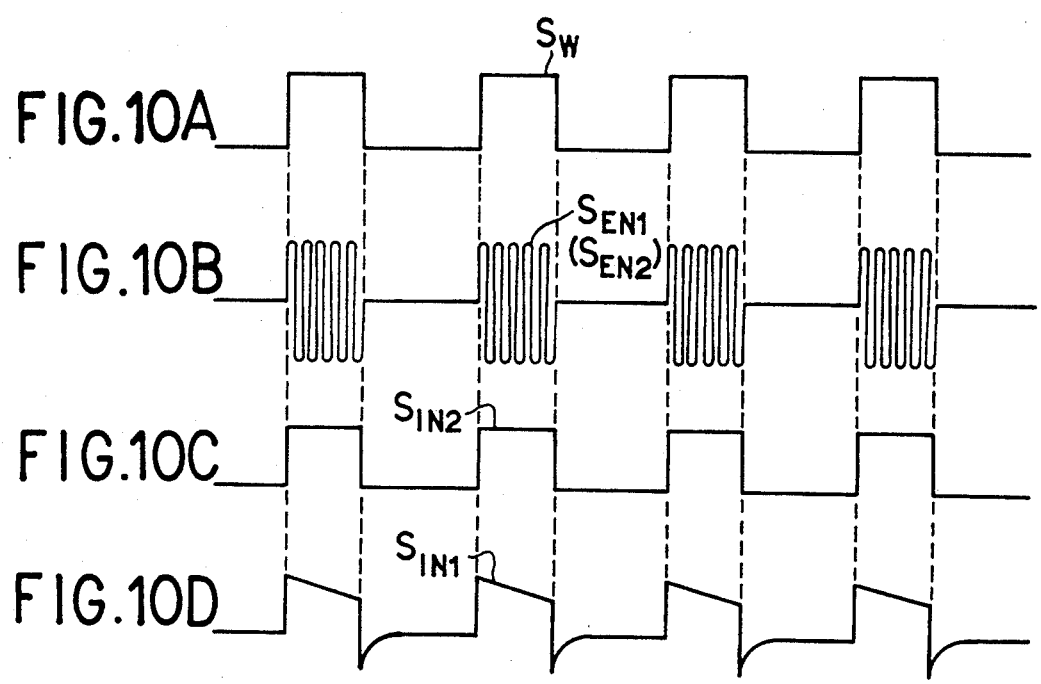
FIGS. 10A, 10B, 10C and 10D are waveform charts illustrating the operation of the information card system of FIG. 9.

A third embodiment of the present invention will now be described with reference to FIGS. 9 and 10. In FIG. 9, parts corresponding to parts of FIG. 3 are designated by the same reference numerals.

In FIG. 9, an information writer 21 of an information card system 20 includes a write signal generating circuit 23 where a write information signal $S_W$ (FIG. 10A) is produced according to predetermined information data. The write information signal $S_W$ is sent as a baseband signal to a multiplier circuit 51 at a data transfer speed of 100 kbps, for example. Simultaneously, a frequency generating circuit 50 supplies a reference frequency signal $S_F$ at a high frequency, 100 MHz, for example, to the multiplier circuit 51. In the multiplier circuit 51, the reference frequency signal $S_F$ is amplitude modulated according to the write information signal $S_W$ to produce a modulated signal $S_{EN1}$ (FIG. 10B), which is sent to writing electrodes 25A and 25B through an amplifying circuit 24. As a result, changes in voltage are produced between the writing electrodes 25A and 25B in response to the modulated signal $S_{EN1}$.

In the third embodiment, an information card having a structure as shown in FIG. 4 may be used as an information card 22. In the information card 22, an input modulated signal $S_{EN2}$ is produced in a plate 29A in response to the modulated signal $S_{EN1}$, with respect to a reference voltage of another plate 29B. The input modulated signal $S_{EN2}$ is sent to a detector circuit 52 which includes a diode to perform envelope detection, so that, as shown in FIG. 10C, a regenerated input information signal $S_{IN2}$ is produced in response to the write information signal $S_W$. The input information signal $S_{IN2}$ is transmitted to an information signal processing circuit 41 for predetermined signal processing and is then stored as information data in a memory in the information signal processing circuit 41. The remaining parts of the information card 22 of the third embodiment are identical to corresponding parts of the information card 22 of FIG. 3, and the description thereof is omitted.

Figure 11:
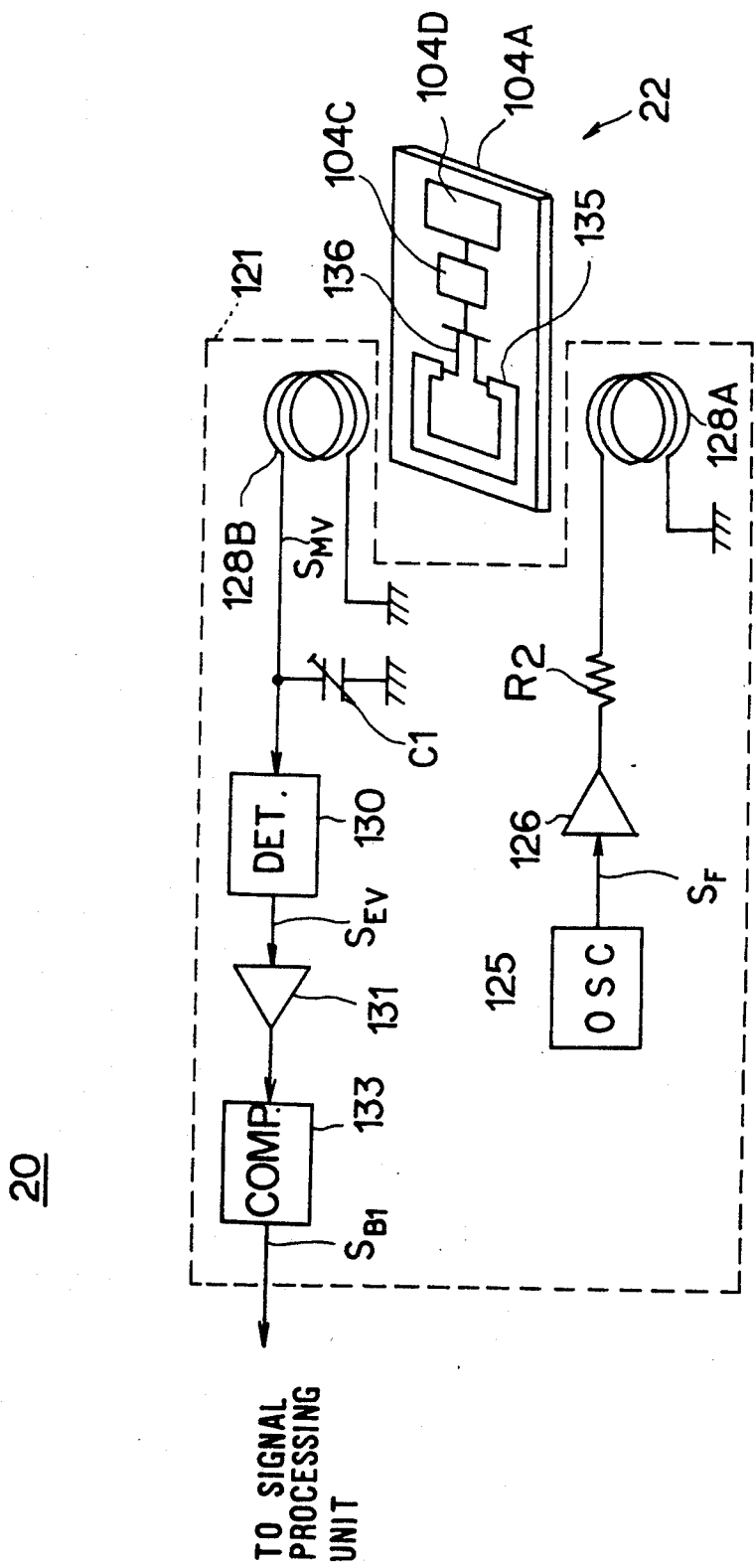
FIG. 11 is a block diagram showing an information card reader according to the present invention.

Referring to FIG. 11, a card reader according to the present invention which reads data, stored in a manner above stated, will now be described. In FIG. 11, an information card system 20 includes an information reader 121 and an information card 22. The information reader 121 is provided with a frequency generating circuit 125 which sends a reference signal $S_F$ at a predetermined frequency higher than several MHz to a magnetic field generating coil 128A through an amplifier circuit 126 of a TTL (transistor transistor logic) circuit configuration and a resistor R2.

The information reader 121 further includes a reading coil 128B arranged at a position opposing the magnetic field generating coil 128A at a predetermined interval of several centimeters. When a magnetic field is produced by supplying the reference signal $S_F$ at a predetermined frequency to the magnetic field generating coil 128A, the magnetic field extends into the region of the reading coil 128B and induces an electromotive force (voltage) in the reading coil 128B. The induced electromotive force is sent as a read signal $S_{MV}$ to a detection circuit 130 through a tuning capacitor C1.

The detection circuit 130 obtains a detected signal $S_{EV}$ by performing envelope detection at the signal level (voltage level) of the read signal $S_{MV}$ and sends it to a comparison circuit 133 through an amplifier circuit 131.

The comparison circuit 133 converts the detected signal $S_{EV}$ to a binary signal $S_{BI}$ at a predetermined signal level and then transmits the binary signal $S_{BI}$ to a subsequent signal processing unit (not shown).

The magnetic field generating coil 128A and the reading coil 128B are spaced, so that the information card 22 can be inserted into the spacing therebetween.

In the information card 22 of FIG. 11, an electrode pattern 135 is mounted on a wiring board 104A to substantially form a 30 mm×37 mm rectangular loop. A field effect transistor 136 is connected to the electrode pattern 135 at opposite ends of the latter at its feeding points. The electrode pattern 135, the field effect transistor 136, an information signal generating circuit 104C and a power supply battery 104D are connected through a wiring pattern. The field effect transistor 136 is on-off controlled according to an information signal sent from the information signal generating circuit 104C, thereby causing the loop of the electrode pattern 135 to be opened or closed.

When, in the information card system 20 of FIG. 11, a reference signal $S_F$ at a frequency of 20 MHz, for example, is supplied to the magnetic field generating coil 128A, current flowing in the magnetic field generating coil 128A changes in response to the reference signal $S_F$, so that a magnetic field is generated by the magnetic field generating coil 128A extending to the reading coil 128B and induces an electromotive force in the reading coil 128B.

When the information card 22 is inserted into the space between the magnetic field generating coil 128A and the reading coil 128B so that the loop of the electrode pattern 135 of the information card 22 is parallel to the magnetic field generating coil 128A and reading coil 128B, an induced current flows in the electrode pattern 135 of the information card 22 only while the electrode pattern 135 is controlled to form a closed loop by turning on the field effect transistor 136. As a result, there is generated a magnetic flux opposite in direction to the magnetic flux which is generated between the magnetic field generating coil 128A and the reading coil 128B, so that the value of the magnetic flux which passes through the reading coil 128B decreases. Thus, the electromotive force induced in the reading coil 128B decreases, so that the signal level (amplitude) of the read signal $S_{MV}$ becomes smaller. This change in amplitude is detected by envelope detection in the detection circuit 130 which produces a detected signal $S_{EV}$ that changes in signal level according to information data of the information card 22. Then, a binary signal $S_{BI}$ which changes according to the information data of the information card 22 is obtained by converting the detected signal $S_{EV}$ to a binary signal in the comparison circuit 133. The binary signal $S_{BI}$ is sent to a subsequent signal processing unit for further signal processing, and thereby information data of the information card 22 can be read in a non-contact manner.

Information data of the information card of FIG. 11 is optimally read by tuning the tuning capacitor C1.

In the information card system 20 of FIG. 11, the loop of the electrode pattern 135 is opened or closed in response to information data of the information card 22, thereby changing the electromotive force (voltage) induced by the magnetic field generating coil 128A in the reading coil 128B of the information reader 121, so that the information reader 121 reads information data of the information card 22 in a non-contact manner.

Although illustrative embodiments of the present invention, and various modifications thereof, have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

What is claimed is:

1. An information card system comprising
a card reader including means for transmitting an interrogation signal to an information card and means for receiving said interrogation signal back from said information card;

an information card including a first pair of electrode plates for receiving a write information signal including predetermined information data, storage means for storing said predetermined information data included in the received write information signal, electrode means for receiving said interrogation signal from said card reader, means for modulating said interrogation signal based on said predetermined information data stored by the storage means to produce a modulated interrogation signal, means for transmitting the modulated interrogation signal through said electrode means back to said card reader, and power supply battery means having a pair of electrode surfaces, one of said electrode surfaces forming one of said first pair of electrode plates; and an information writer including information data generating means for generating the write information signal including said predetermined information data, and a second pair of electrode plates supplied with said write information signal for generating an electrical field in cooperation with said first pair of electrode plates when said information card is disposed in proximity to said information writer to provide said write information signal to said predetermined information card, whereby said information data is written in said storage means of the information card without any required contact between said information card and said information writer.

2. An information card system comprising
a card reader including means for transmitting an interrogation signal to an information card and means for receiving said interrogation signal back from said information card;

an information card including a first pair of electrode plates and a third electrode plate positioned in proximity to said first pair of electrode plates so as to form capacitance between said third electrode plate and each electrode plate of said first pair of electrode plates, said first pair of electrode plates and said third electrode plate being operative to receive a write information signal including predetermined information data, storage means for storing said predetermined information data included in the received write information signal, electrode means for receiving said interrogation signal from said card reader, means for modulating said interrogation signal based on said predetermined information data stored by the storage means to produce a modulated interrogation signal, and means for transmitting the modulated interrogation signal through said electrode means back to said card reader; and an information writer including information data generating means for generating the write information signal including said predetermined information data, and a second pair of electrode plates supplied with said write information signal for generating an electrical field in cooperation with said first pair of electrode plates when said information card is disposed in proximity to said information writer to provide said write information signal to said information card, whereby said predetermined information data is written in said storage means of the information card without any required contact between said information card and said information writer.

* * * * *